United States Patent
Hayase et al.

(10) Patent No.: US 12,359,923 B2
(45) Date of Patent: Jul. 15, 2025

(54) ELECTRONIC CONTROL UNIT

(71) Applicant: HITACHI ASTEMO, LTD., Hitachinaka (JP)

(72) Inventors: Shigenori Hayase, Tokyo (JP); Akira Kuriyama, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/622,602

(22) PCT Filed: Jul. 3, 2020

(86) PCT No.: PCT/JP2020/026215
§ 371 (c)(1),
(2) Date: Dec. 23, 2021

(87) PCT Pub. No.: WO2021/006210
PCT Pub. Date: Jan. 14, 2021

(65) Prior Publication Data
US 2022/0357163 A1    Nov. 10, 2022

(30) Foreign Application Priority Data

Jul. 10, 2019 (JP) ................................. 2019-128408

(51) Int. Cl.
*G01C 21/34* (2006.01)
*G01C 21/00* (2006.01)
(Continued)

(52) U.S. Cl.
CPC ..... *G01C 21/3407* (2013.01); *G01C 21/3691* (2013.01); *G01C 21/3889* (2020.08); *G08G 1/166* (2013.01); *G06V 20/58* (2022.01)

(58) Field of Classification Search
None
See application file for complete search history.

(56) References Cited

U.S. PATENT DOCUMENTS 6,459,991 B1    10/2002   Takiguchi et al.
10,698,116 B2    6/2020   Jördens et al.
(Continued)

FOREIGN PATENT DOCUMENTS

DE    10 2016 201 667 A1    8/2017
JP         H04-51399 A       2/1992
(Continued)

OTHER PUBLICATIONS

International Search Report with English translation and Written Opinion issued in corresponding application No. PCT/JP2020/026215 dated Aug. 4, 2020.
(Continued)

*Primary Examiner* — Vivek D Koppikar
*Assistant Examiner* — David Ruben Pedersen
(74) *Attorney, Agent, or Firm* — Foley & Lardner LLP

(57) ABSTRACT

An electronic control unit includes: a target information acquiring section that acquires information about a target around a user's vehicle; a storage section that stores management information related to at least either an entrance position or exit position of the target in a predetermined subject area on a basis of the information about the target acquired by the target information acquiring section; and a driving trajectory planning section that plans a driving trajectory of the user's vehicle on a basis of the management information stored in the storage section.

5 Claims, 9 Drawing Sheets

(51) Int. Cl.
  *G01C 21/36* (2006.01)
  *G08G 1/16* (2006.01)
  *G06V 20/58* (2022.01)

(56) References Cited

U.S. PATENT DOCUMENTS

| | | | | |
|---|---|---|---|---|
| 2018/0345963 A1* | 12/2018 | Maura | ............... | G05D 1/0088 |
| 2019/0092331 A1* | 3/2019 | Ide | ............... | B60W 10/20 |
| 2019/0283744 A1* | 9/2019 | Miura | ............... | B60W 50/14 |
| 2020/0209873 A1* | 7/2020 | Chen | ............... | G05D 1/0221 |
| 2020/0255029 A1* | 8/2020 | Matsunaga | ............... | G05D 1/0231 |
| 2020/0278681 A1* | 9/2020 | Gier | ............... | G06V 20/56 |
| 2021/0237769 A1* | 8/2021 | Ostafew | ............... | G08G 1/042 |
| 2022/0139222 A1* | 5/2022 | Bao | ............... | G08G 1/163 |
| | | | | 701/24 |
| 2022/0176952 A1* | 6/2022 | Nanri | ............... | G06V 20/56 |

FOREIGN PATENT DOCUMENTS

| | | | |
|---|---|---|---|
| JP | 2001-126199 A | 5/2001 |
| JP | 2007-164339 A | 6/2007 |
| JP | 2018-106589 A | 7/2018 |

OTHER PUBLICATIONS

German Office Action issued in corresponding DE Patent Application No. 112020002733.3, dated May 9, 2025 with English translation (7 pages).

\* cited by examiner

| TARGET ID | ENTRANCE POSITION ID | EXIT POSITION ID | END-OF-LINE FLAG |
|---|---|---|---|
| 501 | 1-2 | 6-1 | True |
| 502 | 1-2 | 6-1 | False |
| 503 | 1-3 | 6-2 | True |
| 504 | A | B | -- |
| ... | | | |

| TARGET ID | ENTRANCE POSITION ID | EXIT POSITION ID | END-OF-LINE FLAG |
|---|---|---|---|
| 501 | 3-3 | 8-1 | True |
| 502 | 1-2 | 6-1 | True |
| 503 | 1-3 | 6-2 | True |
| 504 | A | B | -- |
| ... | | | |

| TARGET ID | ENTRANCE POSITION ID | EXIT POSITION ID |
|---|---|---|
| 501 | 1-3 | 3-1 |
| 502 | 1-5 | 2-1, 2-2 |
| 503 | 1-5 | 3-2 |
| ... | | |

| TARGET ID | ENTRANCE POSITION ID | EXIT POSITION ID | END-OF-LINE FLAG |
|---|---|---|---|
| 501 | 1-2 | 6-1 | True |
|  |  |  |  |
|  |  |  |  |
|  |  |  |  |
|  |  |  |  |

| TARGET ID | ENTRANCE POSITION ID | EXIT POSITION ID | END-OF-LINE FLAG |
|---|---|---|---|
| 501 | 3-3 | 8-1 | True |
|  |  |  |  |
|  |  |  |  |
|  |  |  |  |
|  |  |  |  |

| TARGET ID | ENTRANCE POSITION ID | EXIT POSITION ID | END-OF-LINE FLAG |
|---|---|---|---|
| 503 | 1-3 | 6-2 | True |
| | | | |
| | | | |
| | | | |

ELECTRONIC CONTROL UNIT

TECHNICAL FIELD

The present invention relates to an electronic control unit.

BACKGROUND ART

Electronic control units that are used being mounted on a vehicle, and perform various types of driving assistance for a driver of the vehicle for the realization of automated driving, and the prevention of traffic accidents have been used. Such electronic control units need to plan the speed, and trajectory of the user's vehicle such that the user's vehicle can drive safely in accordance with the surrounding situation.

As a conventional technology associated with the present invention, Patent Literature 1 is known, for example. Patent Literature 1 discloses a right-turn collision prevention system that can accurately determine whether or not a user's vehicle can make a right turn, and can stop the vehicle in order to prevent occurrence of a collision before it happens in a case the vehicle makes a right turn.

CITATION LIST

Patent Literature

Patent Literature 1: Japanese Unexamined Patent Application Publication No. 2001-126199

SUMMARY OF INVENTION

Technical Problem

In the technology described in Patent Literature 1, the trajectory of a non-user's vehicle that is driving on an opposite lane is computed, and estimated from the vehicle state such as a speed, and the possibility of collision is computed on the basis of the trajectory. Accordingly, information as to whether the non-user's vehicle driving on the opposite lane is to drive straight, make a right turn or make a left turn is not taken into consideration, and the movement of a non-user's vehicle driving in the same direction as the user's vehicle is not taken into consideration also. Accordingly, there is a problem that the trajectories of non-user's vehicles cannot be estimated accurately, and a trajectory that allows the user's vehicle to drive safely cannot be planned appropriately.

In view of such a problem, an object of the present invention is the realization of a safe driving trajectory plan.

Solution to Problem

An electronic control unit according to the present invention includes: a target information acquiring section that acquires information about a target around a user's vehicle; a storage section that stores management information related to at least either an entrance position or exit position of the target in a predetermined subject area on a basis of the information about the target acquired by the target information acquiring section; and a driving trajectory planning section that plans a driving trajectory of the user's vehicle on a basis of the management information stored in the storage section.

Advantageous Effects of Invention

According to the present invention, it is possible to realize a safe driving trajectory plan.

BRIEF DESCRIPTION OF DRAWINGS

FIG. 3 is a figure depicting an example of an intra-area target management table.

FIG. 4 is a figure depicting an example of the intra-area target management table.

FIG. 9 is a figure depicting an example of the intra-area target management table.

FIG. 10 is a figure depicting an example of the intra-area target management table.

FIG. 12 is a figure depicting an example of the intra-area target management table.

DESCRIPTION OF EMBODIMENTS

Hereinafter, embodiments of the present invention are explained by using the figures.

First Embodiment

Figure 1:
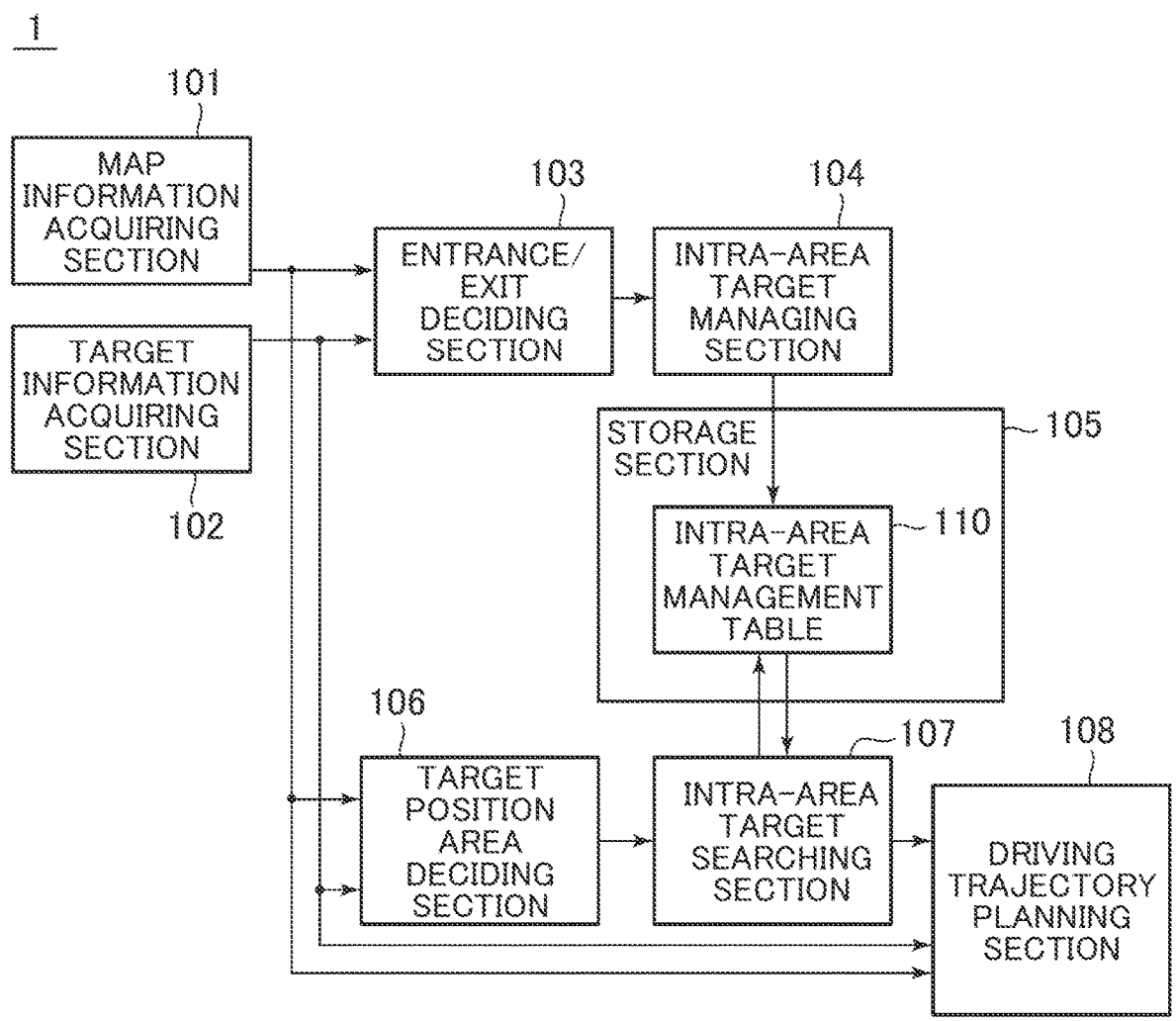
FIG. 1 is a functional block diagram depicting an example of the functional configuration of an electronic control unit according to a first embodiment of the present invention.

FIG. 1 is a functional block diagram depicting an example of the functional configuration of an electronic control unit 1 according to a first embodiment of the present invention. The electronic control unit 1 according to the present embodiment is used being mounted on a vehicle, and has various functionalities including a map information acquiring section 101, a target information acquiring section 102, an entrance/exit deciding section 103, an intra-area target managing section 104, a storage section 105, a target position area deciding section 106, an intra-area target searching section 107, a driving trajectory planning section 108, and the like as depicted in FIG. 1. Note that each of these functionalities is realized in the electronic control unit 1 by a combination of hardware such as a CPU, a RAM or a ROM, for example.

The map information acquiring section 101 acquires information about a map around the user's vehicle, and outputs the information to the entrance/exit deciding section 103, the target position area deciding section 106 and the driving trajectory planning section 108. For example, from map information stored in advance on a memory or the like which is not depicted, the map information acquiring section

101 reads out and acquires map information corresponding to a region around the user's vehicle. Alternatively, by performing wireless communication with a server which is not depicted, the map information acquiring section 101 may download the information about the map around the user's vehicle distributed from the server. Alternatively, by recognizing the geometry and the like of roads around the user's vehicle on the basis of recognition data acquired by an external environment sensor such as a camera, a radar or a LiDAR mounted on the user's vehicle, the map information acquiring section 101 itself may create the information about the map around the user's vehicle. The map information acquired by the map information acquiring section 101 includes positional information about a predetermined subject area which is the subject of a process of the electronic control unit 1, for example an intersection where the user's vehicle is driving.

The target information acquiring section 102 acquires information about targets around the user's vehicle, and outputs the information to the entrance/exit deciding section 103, the target position area deciding section 106 and the driving trajectory planning section 108. For example, about targets such as non-user's vehicles (passenger cars, freight cars, motorcycles, etc.) that are around the user's vehicle, or obstacles (pedestrians, etc.) other than non-user's vehicles, the target information acquiring section 102 acquires information such as relative positions from the user's vehicle, speeds or types as target information related to the targets. That is, the targets about which the target information acquiring section 102 acquires the target information are a concept including not only non-user's vehicles around the user's vehicle, but also all objects that the user's vehicle should recognize at the time of driving. For example, from an external environment sensor such as a camera, a radar or a LiDAR mounted on the user's vehicle, the target information acquiring section 102 acquires information about each target recognized by the external environment sensor. Alternatively, by performing wireless communication with each target around the user's vehicle or a server which manages information about each target, and is not depicted, the target information acquiring section 102 may acquire information about each target. Alternatively, by performing wireless communication with a surrounding situation recognizing apparatus such as a camera installed on a road around the user's vehicle, the target information acquiring section 102 may acquire information about targets recognized by the surrounding situation recognizing apparatus. The target information acquiring section 102 can acquire target information from each target by using any one or more methods.

On the basis of the information about the map around the user's vehicle acquired by the map information acquiring section 101, and the target information about each target acquired by the target information acquiring section 102, the entrance/exit deciding section 103 decides whether or not each target has entered the subject area mentioned before or has exited the subject area. Then, about targets decided as having entered the subject area, entrance positions and exit positions of the targets are decided, and results of the decisions are output to the intra-area target managing section 104. On the other hand, about targets decided as having exited the subject area, results of the decisions are output to the intra-area target managing section 104.

As information representing entrance positions and exit positions of targets having entered the subject area, the entrance/exit deciding section 103 outputs information depicting positions on a map, for example. Alternatively, by referring to the map information acquired by the map information acquiring section 101, the entrance/exit deciding section 103 may convert the positions on the map into positions on roads, and output the information. For example, in a case that the subject area is an intersection, and a target is a non-user's vehicle having entered the intersection, an entrance position, and an exit position of the non-user's vehicle are converted into road numbers for making a distinction between roads at the intersection and lane numbers for making a distinction between lanes at the intersection, and the road numbers and the lane numbers can be output. At this time, in a case that the map information includes information about connection between lanes at the intersection, a lane connected to a lane of the entrance position can be determined as a lane of the exit position. That is, on the basis of the map information and an entrance position of each target, the entrance/exit deciding section 103 can decide an exit position of the target. In addition, in a case that a target is a pedestrian walking on a crosswalk, an entrance position, and an exit position of the pedestrian can be converted into a crosswalk number for making a distinction between crosswalks at the intersection, and the crosswalk number can be output.

Note that when entrance positions and exit positions of targets are determined at the entrance/exit deciding section 103, features in images captured by a camera which is an external environment sensor may be used. For example, in a case that an image of a non-user's vehicle which is a target is captured by the camera, and acquired by the target information acquiring section 102, an entrance position, and an exit position can be determined by determining an advancing direction of the non-user's vehicle from features in the image. Specifically, for example, by determining the direction of the non-user's vehicle from the body shape, an arrangement or shapes of various parts, or the like of the non-user's vehicle captured in the image, or by determining whether any of left and right blinkers is flashing from the image, the advancing direction of the non-user's vehicle can be determined. Furthermore, the advancing direction of the non-user's vehicle may be determined on the basis of changes between a plurality of images acquired time-sequentially. In such a case, it becomes possible for the entrance/exit deciding section 103 to determine the entrance position, and exit position of the non-user's vehicle without having to refer to the map information acquired by the map information acquiring section 101. In addition, other than these, the entrance/exit deciding section 103 can determine an entrance position, and an exit position of a target by using any method.

On the basis of information about an entrance position, and an exit position of each target output from the entrance/exit deciding section 103, the intra-area target managing section 104 manages information stored in the storage section 105. Specifically, as management information for managing an entrance position, and an exit position of each target, the storage section 105 stores an intra-area target management table 110 like the ones depicted in examples mentioned below. The intra-area target management table 110 retains a target ID for distinguishing each target, and information about an entrance position, and an exit position of each target, for example. In a case that information about a target having entered a subject area is output from the entrance/exit deciding section 103, the intra-area target managing section 104 adds the information about the target to the intra-area target management table 110. In addition, in a case that information about a target having exited a subject area is output from the entrance/exit deciding section 103, the intra-area target managing section 104 deletes the information about the target from the intra-area target management table 110. Thereby, the intra-area target managing section 104 manages the intra-area target management table 110 stored in the storage section 105 serially in accordance with the situation around the user's vehicle.

On the basis of the information about the map around the user's vehicle acquired by the map information acquiring section 101, and the target information about each target acquired by the target information acquiring section 102, the target position area deciding section 106 decides whether or not each target is in the subject area, and outputs results of the decisions to the intra-area target searching section 107. Note that the process performed by the target position area deciding section 106 of deciding whether each target is in the subject area has contents which are nearly identical to the contents of the process performed by the entrance/exit deciding section 103 of making a decision about entrance and exit of each target into and from the subject area. Accordingly, the entrance/exit deciding section 103 and the target position area deciding section 106 may be integrated, and realized by one functional block.

In addition, on the basis of the intra-area target management table 110 stored in the storage section 105, the target position area deciding section 106 may decide whether or not each target is in the subject area. For example, it is also possible to decide whether or not each target is in the subject area by searching the intra-area target management table 110 stored in the storage section 105, and deciding whether or not information about the target is retained in the intra-area target management table 110.

About each target decided by the target position area deciding section 106 as being in the subject area, the intra-area target searching section 107 searches the intra-area target management table 110 for information about the target. Thereby, information about an entrance position, and an exit position of each target in the subject area can be obtained. The information about each target in the subject area found through the search by the intra-area target searching section 107 is output to the driving trajectory planning section 108.

The driving trajectory planning section 108 plans a driving trajectory of the user's vehicle on the basis of the positional relationship between the user's vehicle and the intra-area target management table 110 stored in the storage section 105. For example, the driving trajectory planning section 108 plans a driving trajectory of the user's vehicle by using the information about the map around the user's vehicle acquired by the map information acquiring section 101, the target information about each target acquired by the target information acquiring section 102, and the information about each target in the subject area found through the search in the intra-area target management table 110 by the intra-area target searching section 107. At this time, the driving trajectory planning section 108 estimates a trajectory of each target in the subject area on the basis of the target information about each target acquired by the target information acquiring section 102. On the basis of the positional relationship between results of the estimation, and the user's vehicle, the driving trajectory planning section 108 plans a driving trajectory that allows the user's vehicle to drive safely without occurrence of a collision with each target in the subject area.

The driving trajectory of the user's vehicle planned by the driving trajectory planning section 108 is output from the electronic control unit 1 to another electronic control unit (not depicted) that perform driving control of the user's vehicle. The electronic control unit controls the user's vehicle so as to drive the user's vehicle in accordance with the driving trajectory of the user's vehicle output from the electronic control unit 1. Thereby, it is possible to drive the user's vehicle safely without occurrence of a collision with each target in the subject area.

The electronic control unit 1 according to the present embodiment has functional configuration like the one explained above. Hereinbelow, specific examples of processes at the electronic control unit 1 according to the present embodiment are explained by using FIG. 2, FIG. 3, and FIG. 4 about a case that a subject area is an area including an intersection.

Figure 2:
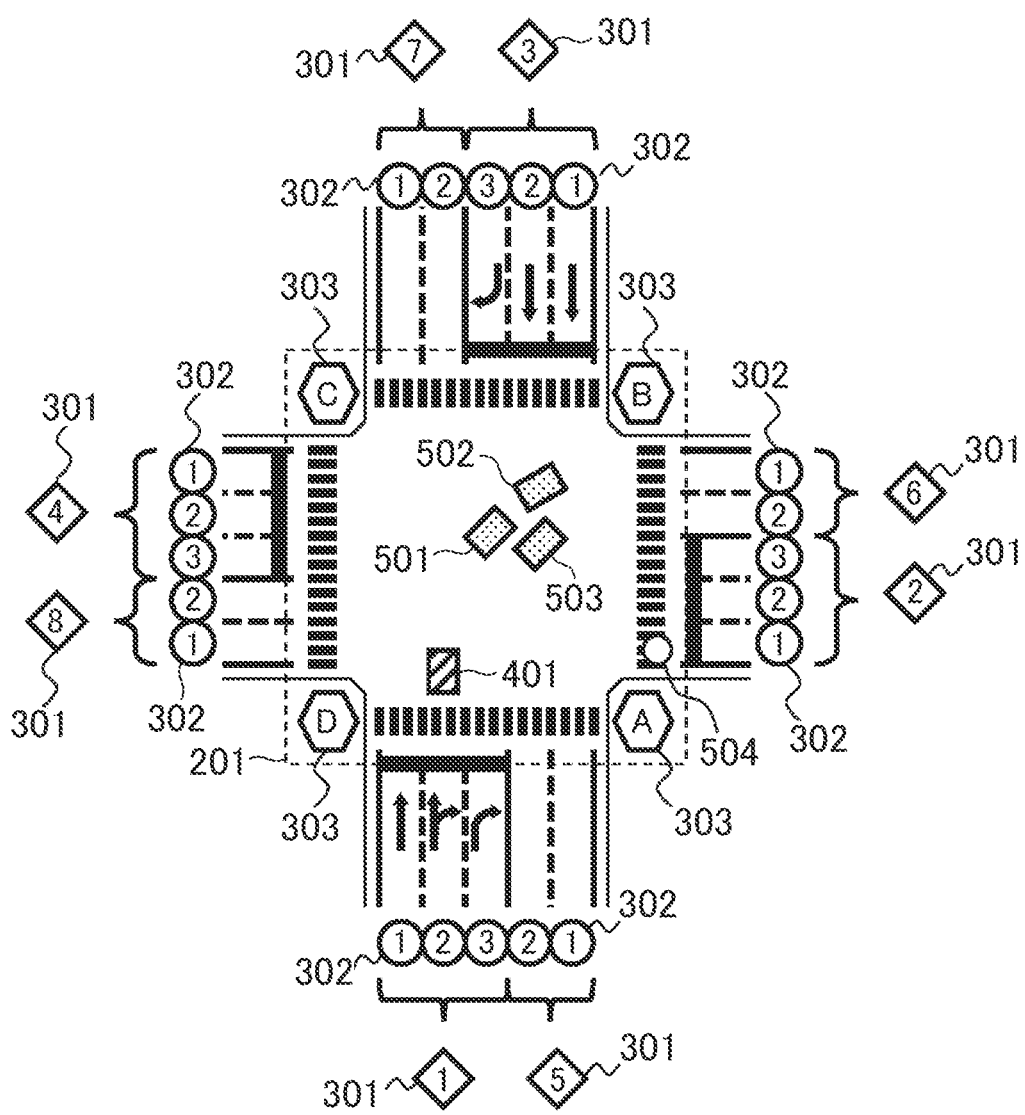
FIG. 2 is a figure depicting a situation of and around an intersection according to the first embodiment of the present invention.

FIG. 2 is a figure depicting a situation of and around the intersection according to the first embodiment of the present invention. An intersection area 201 depicted in FIG. 2 is an example of a subject area of processes implemented by the electronic control unit 1 according to the present embodiment.

Roads extending in four directions are connected in the intersection area 201. These roads extending in the four directions are given road numbers 1 to 8 as represented by reference character 301. Note that road numbers which are different for different advancing directions are given to each of the roads extending in the four directions in order to make a distinction between roads for entering the intersection area 201, and roads for exiting the intersection area 201 in the example in FIG. 2. That is, road numbers 1 to 4 are given to roads for entering the intersection area 201 starting from the road depicted on the bottom side in the figure counterclockwise, and road numbers 5 to 8 are given to roads for exiting the intersection area 201 starting from the road depicted on the bottom side in the figure counterclockwise.

Each road has a plurality of lanes, and lane numbers are given to lanes for each road as represented by reference character 302. In addition, a crosswalk is marked on each road in the intersection area 201, and crosswalk numbers as represented by reference character 303 are given to the locations of sidewalks where the crosswalks are connected.

As map information about the intersection area 201, the map information acquiring section 101 acquires map information in which information with various numbers like the ones explained above is given to each road. It is supposed that a user's vehicle 401 on which the electronic control unit 1 according to the present embodiment is mounted is driving in this intersection area 201, and furthermore there are non-user's vehicles 501, 502, and 503 as targets in the intersection area 201. In addition, it is supposed that there is a pedestrian 504 as a target on a crosswalk in the intersection area 201.

Before the user's vehicle 401 reaches its position in FIG. 2 after entering from a road with road number 1, and lane number 2, the electronic control unit 1 uses the target information acquiring section 102 to acquire target information about the non-user's vehicles 501, 502, and 503 having entered the intersection area 201, and the pedestrian 504. Then, entrance positions, and exit positions of these targets in the intersection area 201 are determined, and are managed in the intra-area target management table 110 stored in the storage section 105. Regarding the situation in FIG. 2, it is supposed that the storage section 105 stores the intra-area target management table 110 with contents depicted in FIG. 3, for example.

In the intra-area target management table 110 in FIG. 3, a column 111 includes target IDs each of which is set uniquely for a target in advance. In the example in FIG. 3, reference characters of targets which are the non-user's vehicles 501, 502, and 503, and the pedestrian 504 represent target IDs. A column 112 includes entrance position IDs each of which represents an entrance position of a target, and a column 113 includes exit position IDs each of which represents an exit position of a target. In the example in FIG. 3, entrance position IDs, and exit position IDs of the non-user's vehicles 501, 502, and 503 are represented by combinations of road numbers, and lane numbers depicted in FIG. 2. In addition, an entrance position ID, and exit position ID of the pedestrian 504 are represented by crosswalk numbers depicted in FIG. 2. A column 114 includes end-of-line flags each of which represents whether or not a target is at the end of a line. In the example in FIG. 3, about each of the non-user's vehicle 501, 502, and 503, "True" is set in a case that the non-user's vehicle is positioned at the end of a line, and "False" is set in a case that the non-user's vehicle is not at the end of a line. Note that an end-of-line flag is not set for the pedestrian 504, who is not a vehicle. Management of the end-of-line flags is mentioned below.

As mentioned before, the user's vehicle 401 is entering from the road with road number 1, and lane number 2, and so the entrance position ID of the user's vehicle 401 is represented as "1-2." In the intra-area target management table 110 in FIG. 3, entrance position IDs which are the same as the user's vehicle 401 are set for the non-user's vehicles 501, and 502. Thereby, it can be known that the non-user's vehicles 501, and 502 have entered the intersection area 201 from the same lane as the user's vehicle 401, and are making right turns at the intersection toward a road lane corresponding to exit position ID "6-1," that is, a left lane of a road extending rightward from the intersection area 201. In addition, it can be known from the values of end-of-line flags that not the non-user's vehicle 502, but the non-user's vehicle 501 is at the end of a line. Accordingly, in a case that the user's vehicle 401 makes a right turn at the intersection toward the same road lane as the non-user's vehicles 501, and 502, the driving trajectory planning section 108 plans a driving trajectory of the user's vehicle 401 such that the user's vehicle 401 follows the non-user's vehicle 501 at the end of the line.

On the other hand, in the intra-area target management table 110 in FIG. 3, entrance position ID "1-3" representing a lane positioned to the right of the entrance position of the user's vehicle 401 is set for the non-user's vehicle 503. Thereby, it can be known that the non-user's vehicle 503 has entered the intersection area 201 from a right lane of the same road as the user's vehicle 401, and is making a right turn at the intersection toward a road lane corresponding to exit position ID "6-2," that is, a right lane of the road extending rightward from the intersection area 201. Accordingly, in a case that the user's vehicle 401 makes a right turn at the intersection, the driving trajectory planning section 108 plans a driving trajectory of the user's vehicle 401 such that the user's vehicle 401 passes by the non-user's vehicle 503 on the left side of the non-user's vehicle 503.

Furthermore, in the intra-area target management table 110 in FIG. 3, entrance position ID "A," and exit position ID "B" representing a crosswalk which will be located ahead of the user's vehicle 401, and the non-user's vehicles 501, 502, and 503 after making right turns are set for the pedestrian 504. Thereby, it can be known that the pedestrian 504 is traversing the crosswalk which will be located ahead of the non-user's vehicles 501, 502, and 503 after making right turns, and so it is expected the non-user's vehicles 501, 502, and 503 will decelerate before the crosswalk. Accordingly, in a case that the user's vehicle 401 makes a right turn at the intersection, the driving trajectory planning section 108 plans a driving trajectory of the user's vehicle 401 such that the user's vehicle 401 also decelerates in accordance with deceleration of the non-user's vehicles 501, 502, and 503.

On the other hand, in a case that the user's vehicle 401 does not make a right turn at the intersection, but drives straight toward a road lane corresponding to exit position ID "7-2," the exit position ID is different from all of the exit position IDs of the non-user's vehicles 501, 502, and 503. Accordingly, it can be determined that the user's vehicle 401 needs not to follow the non-user's vehicles. Accordingly, the driving trajectory planning section 108 plans a driving trajectory of the user's vehicle 401 such that the user's vehicle 401 passes by the non-user's vehicles 501, 502, and 503 avoiding them.

By the processes explained above, the electronic control unit 1 according to the present embodiment can draw up a trajectory plan that allows the user's vehicle 401 to drive safely in any of the case that the user's vehicle 401 makes a right turn, and the case that the user's vehicle 401 drives straight.

Here, in a case that the direction of the non-user's vehicle 501 is different from the direction in the example mentioned before, the contents of the intra-area target management table 110 change from the contents in FIG. 3 to the contents in FIG. 4, for example, even if the subject area for which the electronic control unit 1 performs the processes is the same intersection area 201 in FIG. 2. In this case, the driving trajectory planning section 108 plans the driving trajectory of the user's vehicle 401 as follows.

The intra-area target management table 110 in FIG. 4 is different from FIG. 3 in terms of the entrance position ID, and exit position ID of the non-user's vehicle 501, and the end-of-line flag of the non-user's vehicle 502. That is, the entrance position ID, and exit position ID of the non-user's vehicle 501 are set to "3-3," and "8-1," respectively, in FIG. 4. Thereby, it can be known that the non-user's vehicle 501 has entered the intersection area 201 from a road with road number 3, and lane number 3 which is a lane opposite to the user's vehicle 401, and is making a right turn at the intersection toward a left lane of a road extending leftward from the intersection area 201 (rightward as seen from the non-user's vehicle 501). On the other hand, it can be known that the non-user's vehicle 502 is at the end of a line, has entered the intersection area 201 from the same lane as the user's vehicle 401, and is making a right turn at the intersection toward a road lane corresponding to exit position ID "6-1," that is, the left lane of the road extending rightward from the intersection area 201.

On the basis of the situation described above, in a case that the user's vehicle 401 makes a right turn at the intersection toward the same road lane as the non-user's vehicle 502, the driving trajectory planning section 108 plans a driving trajectory of the user's vehicle 401 such that the user's vehicle 401 follows the non-user's vehicle 502 at the end of the line. At this time, the driving trajectory planning section 108 plans the driving trajectory of the user's vehicle 401 such that the user's vehicle 401 passes by the non-user's vehicle 501, which is a car making a right turn on the opposite lane, on the right side of the non-user's vehicle 501 (on the left side as seen from the non-user's vehicle 501), and passes by the non-user's vehicle 503 on the left side of the non-user's vehicle 503.

On the other hand, in a case that the user's vehicle 401 drives straight at the intersection, and drives toward a road lane corresponding to exit position ID "7-2," it can be foreseen that a driving trajectory of the non-user's vehicle 501 that makes a right turn from the opposite lane crosses the driving trajectory of the user's vehicle 401. Accordingly, the driving trajectory planning section 108 plans the driving trajectory of the user's vehicle 401 taking the relationship between the speed of the non-user's vehicle 501, and the speed of the user's vehicle 401 into consideration. For example, the driving trajectory planning section 108 adjusts the speed, and driving trajectory of the user's vehicle 401 such that the user's vehicle 401 avoids a collision with the non-user's vehicle 501.

As explained above, the electronic control unit 1 according to the present embodiment can appropriately understand the situation of an external environment where the user's vehicle 401 is by managing an entrance position, and an exit position of each target in the intersection area 201 by using the intra-area target management table 110 examples of which are depicted in FIG. 3, and FIG. 4. Accordingly, the driving trajectory planning section 108 can estimate the movement of each target accurately, and draw up a trajectory plan that allows the user's vehicle 401 to drive safely.

Figure 5:
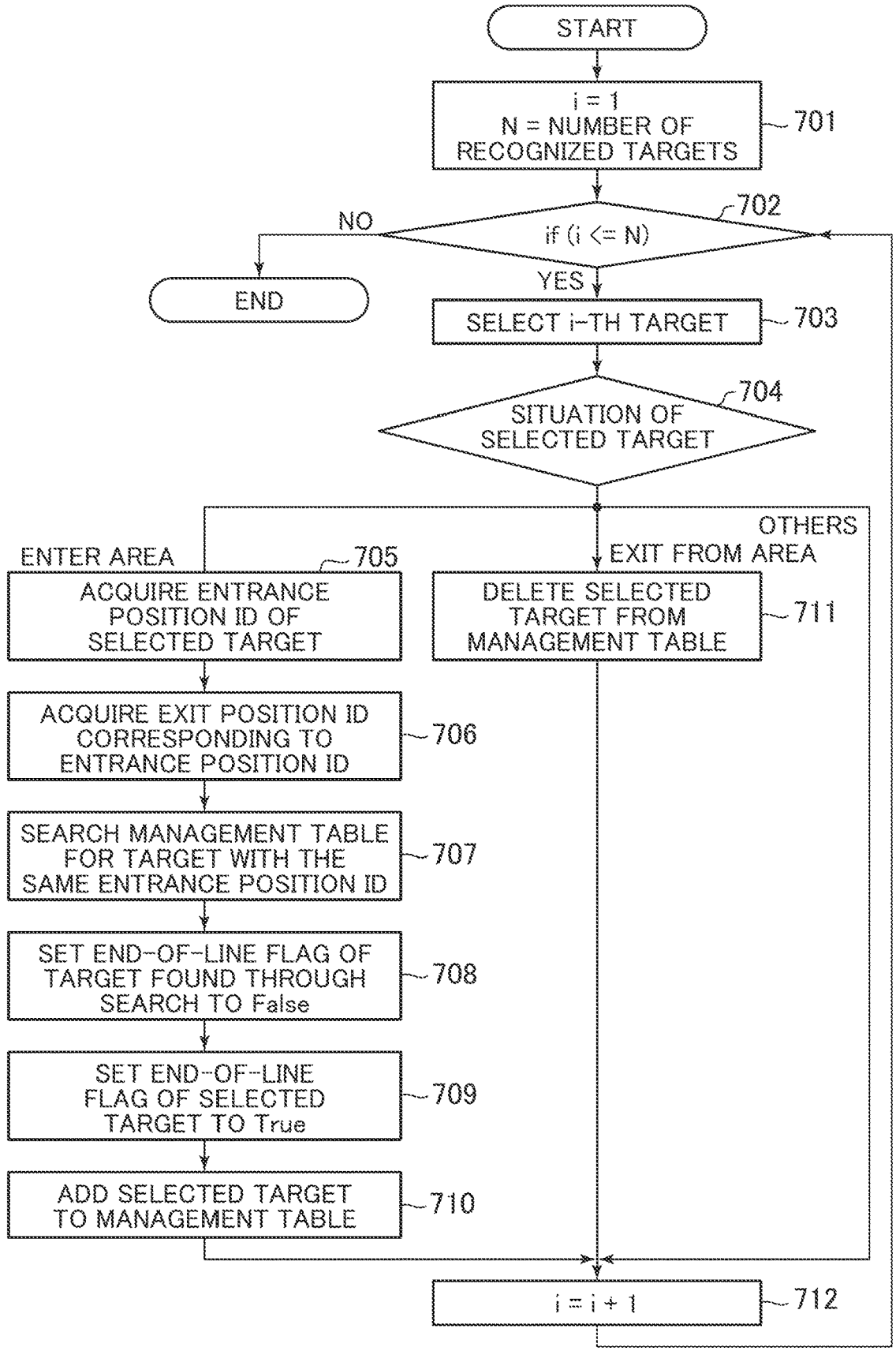
FIG. 5 is a figure depicting an example of a flowchart depicting the flow of a process of managing the intra-area target management table.

Next, a process of managing the intra-area target management table 110 performed by the intra-area target managing section 104 in the electronic control unit 1 according to the present embodiment is explained. FIG. 5 is a figure depicting an example of a flowchart depicting the flow of a process of managing the intra-area target management table 110.

At Step 701, the intra-area target managing section 104 initializes variable i to 1, and also assigns the number of recognized targets to variable N.

At Step 702, the intra-area target managing section 104 decides whether or not variable i is equal to or smaller than N. In a case that variable i is equal to or smaller than N, the process proceeds to Step 703, and in a case that variable i has exceeded N, the flowchart in FIG. 5 is ended. Note that after execution of a series of processes at and after Step 703, the intra-area target managing section 104 increments variable i at Step 712 mentioned below. Thereby, a loop that applies the series of processes to each target one after another is formed.

At Step 703, the intra-area target managing section 104 selects an i-th target. It is supposed here that the N targets are given numbers in order of entrance into a subject area, and at Step 703 the numbers are used to select an i-th target. Thereby, a target to be the subject of the following processes is fixed.

At Step 704, the intra-area target managing section 104 determines whether the situation of a target selected at Step 703 corresponds to any of entrance, exit or others. That is, intra-area target managing section 104 determines whether the target has entered a predetermined subject area, has exited the subject area or is in another situation. Note that such another situation means a situation where, for example, the target decided as having entered the subject area has not exited, but stayed in the subject area or another situation. In a case that it is determined at Step 704 that the target has entered, the process proceeds to Step 705, and in a case that it is determined that the target has exited, the process proceeds to Step 711. In addition, in a case that it is determined that the target has neither entered nor exited, the process proceeds to Step 712.

At Step 705, the intra-area target managing section 104 acquires an entrance position ID corresponding to an entrance position of the target.

At Step 706, the intra-area target managing section 104 acquires an exit position ID corresponding to an exit position of the target. Note that in a case that the exit position ID cannot be acquired, the process at Step 706 may be omitted.

At Step 707, the intra-area target managing section 104 searches the intra-area target management table 110 for, as a preceding vehicle of the target, a target corresponding to an entrance position ID set to the same entrance position ID as the target acquired at Step 705.

At Step 708, the intra-area target managing section 104 sets, to "False," the value of an end-of-line flag of the target found through the search at Step 707, that is, the preceding vehicle of the target selected at Step 703. Thereby, the value of the end-of-line flag of the target that had been at the end of a line up to that point is changed from "True" to "False." Note that in a case that the value of the end-of-line flag has already been set to "False," it is sufficient if it is left unchanged.

At Step 709, the intra-area target managing section 104 sets the value of an end-of-line flag of the target selected at Step 703 to "True."

At Step 710, the intra-area target managing section 104 adds fields of the target selected at Step 703 to the intra-area target management table 110, and sets the entrance position ID, and exit position ID acquired at Steps 705, and 706, respectively, and the value of the end-of-line flag set at Step 709 in the added fields of the target. Thereby, information about the target having entered the subject area is added in the intra-area target management table 110, and stored in the storage section 105.

After the information about the target is added in the intra-area target management table 110 at Step 710, the process proceeds to Step 712.

At Step 711, the intra-area target managing section 104 deletes information about the target from the intra-area target management table 110. Thereby, the information about the target having exited the subject area is erased from the intra-area target management table 110, and the target is excluded from subjects of processes to be performed when the driving trajectory planning section 108 plans a driving trajectory of the user's vehicle.

After the information about the target is deleted from the intra-area target management table 110 at Step 711, the process proceeds to Step 712.

At Step 712, variable i is incremented. After Step 712 is executed, the process returns to Step 702, and the processes mentioned before are repeated.

The intra-area target managing section 104 can manage the intra-area target management table 110 in accordance with the latest situation around the user's vehicle by loop-executing a series of processes like the one described above.

Note that whereas a target at the end of a line is selected on the basis of entrance position IDs, and the value of the end-of-line flag is set to "True" in the example explained about Steps 707 to 709 described above, it is also possible to select a target at the end of a line on the basis of exit position IDs, instead of entrance position IDs. In that case, it is sufficient if a preceding vehicle is searched for on the basis not of not entrance position IDs, but of exit position IDs at Step 707. Alternatively, a preceding vehicle may be searched for by using both entrance position IDs, and exit position IDs.

Here, in the example explained about the embodiment described above, the storage section 105 has stored therein the intra-area target management table 110 as management information for managing an entrance position and an exit position of each target, and, on the basis of the positional relationship between the user's vehicle and the entrance position, and exit position of each target represented by the intra-area target management table 110, the driving trajectory planning section 108 plans a driving trajectory of the user's vehicle. However, the intra-area target management table 110 may manage only either one of an entrance position, and an exit position of each target, and, on the basis of the positional relationship between the user's vehicle and the managed entrance position or exit position, the driving trajectory planning section 108 may plan a driving trajectory of the user's vehicle. In this case, it is sufficient if the entrance/exit deciding section 103 decides only either one of the entrance position, and exit position of each target, and outputs results of the decision to the intra-area target managing section 104.

According to the first embodiment of the present invention explained above, the following effects and advantages are attained.

(1) The electronic control unit 1 includes: the target information acquiring section 102 that acquires information about a target around a user's vehicle; the storage section 105 that stores the intra-area target management table 110 which is management information related to at least either an entrance position or exit position of the target in a predetermined subject area on the basis of the information about the target acquired by the target information acquiring section 102; and the driving trajectory planning section 108 that plans a driving trajectory of the user's vehicle on the basis of the intra-area target management table 110 stored in the storage section 105. Because of this configuration, a safe driving trajectory plan can be realized.

(2) The electronic control unit 1 includes: the map information acquiring section 101 that acquires map information about the subject area; and the entrance/exit deciding section 103 that decides at least either the entrance position or exit position of the target on the basis of the map information acquired by the map information acquiring section 101, and the information about the target acquired by the target information acquiring section 102. Because of this configuration, at least either the entrance position or exit position of the target can be determined appropriately.

(3) The entrance/exit deciding section 103 can decides the exit position on the basis of the map information, and the entrance position. Because of this configuration, the exit position can be determined surely from the entrance position.

(4) The intra-area target management table 110 includes an end-of-line flag which is information representing whether or not the target is at the end of a line. Because of this configuration, a target that the user's vehicle should follow among a plurality of targets managed by the intra-area target management table 110 can be determined easily.

(5) The target around the user's vehicle that the electronic control unit 1 treats as a processing subject includes a non-user's vehicle driving in front of the user's vehicle on the same road as the user's vehicle, a pedestrian walking on a crosswalk, and the like. Because of this configuration, a target that is likely to influence a driving trajectory of the user's vehicle can be surely treated as a processing subject.

(6) The subject area described above is an area including an intersection, for example. Because of this configuration, a safe driving trajectory can be planned when the user's vehicle drives through an intersection.

(7) The target information acquiring section 102 can acquire the information about the target from an external environment sensor mounted on the user's vehicle. In addition, the target information acquiring section 102 can also acquire the information about the target through communication with the target or a server that manages the information about the target, because of this configuration, it is possible to acquire the information about the target by using an appropriate method according to the configuration of the user's vehicle.

(8) The driving trajectory planning section 108 plans a driving trajectory of the user's vehicle on the basis of the relationship between at least either the entrance position or exit position of the target represented by the intra-area target management table 110, and a position of the user's vehicle. Because of this configuration, it is possible to appropriately estimate the movement of each target, and surely plan a driving trajectory that allows the user's vehicle to drive safely.

Second Embodiment

Next, a second embodiment of the present invention is explained. Processes to be performed by the electronic control unit 1 in a case that an area including a tollgate exit of a freeway or the like is treated as a subject area are explained in the present embodiment. Note that the configuration of the electronic control unit 1 according to the present embodiment is identical to the configuration in FIG. 1 explained in the first embodiment. Accordingly, hereinbelow, a specific example of processes in the electronic control unit 1 according to the present embodiment with the configuration in FIG. 1 is explained.

Figures 6, 7:
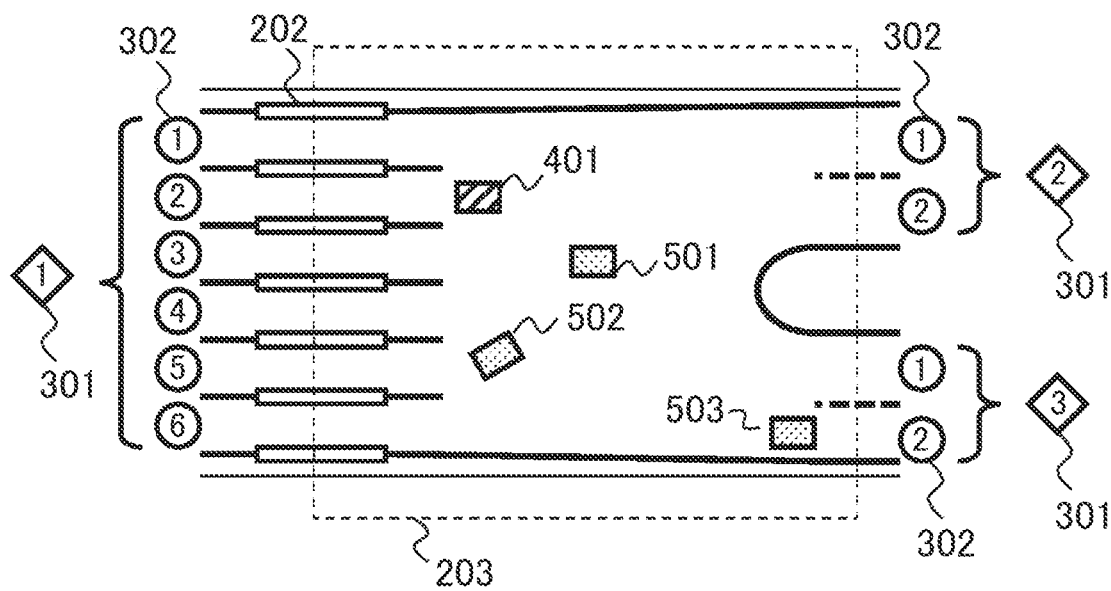
FIG. 6 is a figure depicting a situation of and around a tollgate exit according to a second embodiment of the present invention.
FIG. 7 is a figure depicting an example of the intra-area target management table.

FIG. 6 is a figure depicting a situation of and around a tollgate exit according to the second embodiment of the present invention. A tollgate exit area 203 depicted in FIG. 6 is an example of a subject area of processes implemented by the electronic control unit 1 according to the present embodiment.

The tollgate exit area 203 is connected with a road which is an entrance from a tollgate 202, and a road which is an exit to two directions. These roads are given road numbers 1 to 3 as represented by reference character 301. In addition, each road has a plurality of lanes, and lane numbers are given to lanes for each road as represented by reference character 302. That is, each vehicle having passed through the tollgate 202, and entered the tollgate exit area 203 advances from the tollgate exit area 203 toward a road with either road number of 2 and 3, and passes through the road to exit the tollgate exit area 203.

As map information about the tollgate exit area 203, the map information acquiring section 101 acquires map information in which information with various numbers like the ones explained above is given to each road. It is supposed that the user's vehicle 401 on which the electronic control unit 1 according to the present embodiment is mounted is driving in this tollgate exit area 203, and furthermore there are the non-user's vehicles 501, 502, and 503 as targets in the tollgate exit area 203.

Before the user's vehicle 401 reaches its position in FIG. 6 after entering from a road with road number 1, and lane number 2, the electronic control unit 1 uses the target information acquiring section 102 to acquire target information about the non-user's vehicles 501, 502, and 503 having entered the tollgate exit area 203. Then, entrance positions, and exit positions of these targets in the tollgate exit area 203 are determined, and are managed in the intra-area target management table 110 stored in the storage section 105. Regarding the situation in FIG. 6, it is supposed that the storage section 105 stores the intra-area target management table 110 with contents depicted in FIG. 7, for example.

Similarly to the intra-area target management table 110 in FIG. 3 and FIG. 4 explained in the first embodiment, in the intra-area target management table 110 in FIG. 7, the columns 111, 112, and 113 include target IDs, entrance position IDs and exit position IDs each of which is set for a target in the non-user's vehicles 501, 502, and 503. The expression format of each of these set values is similar to the expression format explained in the first embodiment. Note that end-of-line flags are not set.

It can be known from the intra-area target management table 110 in FIG. 7 that the non-user's vehicle 501 is driving from a road lane corresponding to entrance position ID "1-3" toward a road lane corresponding to exit position ID "3-1." It is supposed here that the user's vehicle 401 is driving from a road lane corresponding to entrance position ID "1-2" toward a road lane corresponding to exit position ID "3-1." In this case, the user's vehicle 401 is advancing from the same direction as the non-user's vehicle 501 toward the same road lane. Accordingly, the driving trajectory planning section 108 plans a driving trajectory of the user's vehicle 401 such that the user's vehicle 401 follows the non-user's vehicle 501.

On the other hand, it can be known from the intra-area target management table 110 in FIG. 7 that the non-user's vehicle 502 is driving from a road lane corresponding to entrance position ID "1-5" toward a road lane corresponding to exit position ID "2-1" or "2-2." In this case, the driving trajectories of the user's vehicle 401 and the non-user's vehicle 502 cross each other. Accordingly, the driving trajectory planning section 108 needs to plan a driving trajectory of the user's vehicle 401 such that the user's vehicle 401 avoids a collision with the non-user's vehicle 502. For example, in a case that it is determined from the speed of the non-user's vehicle 502 that there is a risk of a collision with the user's vehicle 401, the driving trajectory planning section 108 plans a driving trajectory of the user's vehicle 401 such that the user's vehicle 401 waits until the non-user's vehicle 502 drives across in front of the user's vehicle 401. Note that the intra-area target management table 110 can also store information about a plurality of exit positions in an exit position ID field as in the example depicted in FIG. 7. Thereby, it is possible to express that a target advances to one of a plurality of exit positions.

According to the second embodiment of the present invention explained above, effects and advantages that are similar to those explained in the first embodiment can be attained. In addition, a subject area about which at least either entrance positions or exit positions of targets are managed in the intra-area target management table 110 is an area including a tollgate exit, for example. Because of this configuration, a safe driving trajectory can be planned when the user's vehicle drives through the tollgate exit.

Third Embodiment

Next, a third embodiment of the present invention is explained. A specific example of a process of planning a driving trajectory of a user's vehicle performed by the driving trajectory planning section 108 in the electronic control unit 1 is explained in the present embodiment. Note that similarly to the second embodiment, the configuration of the electronic control unit 1 according to the present embodiment also is identical to the configuration in FIG. 1 explained in the first embodiment. Accordingly, hereinbelow, a specific example of processes in the electronic control unit 1 according to the present embodiment with the configuration in FIG. 1 is explained.

Figure 8:
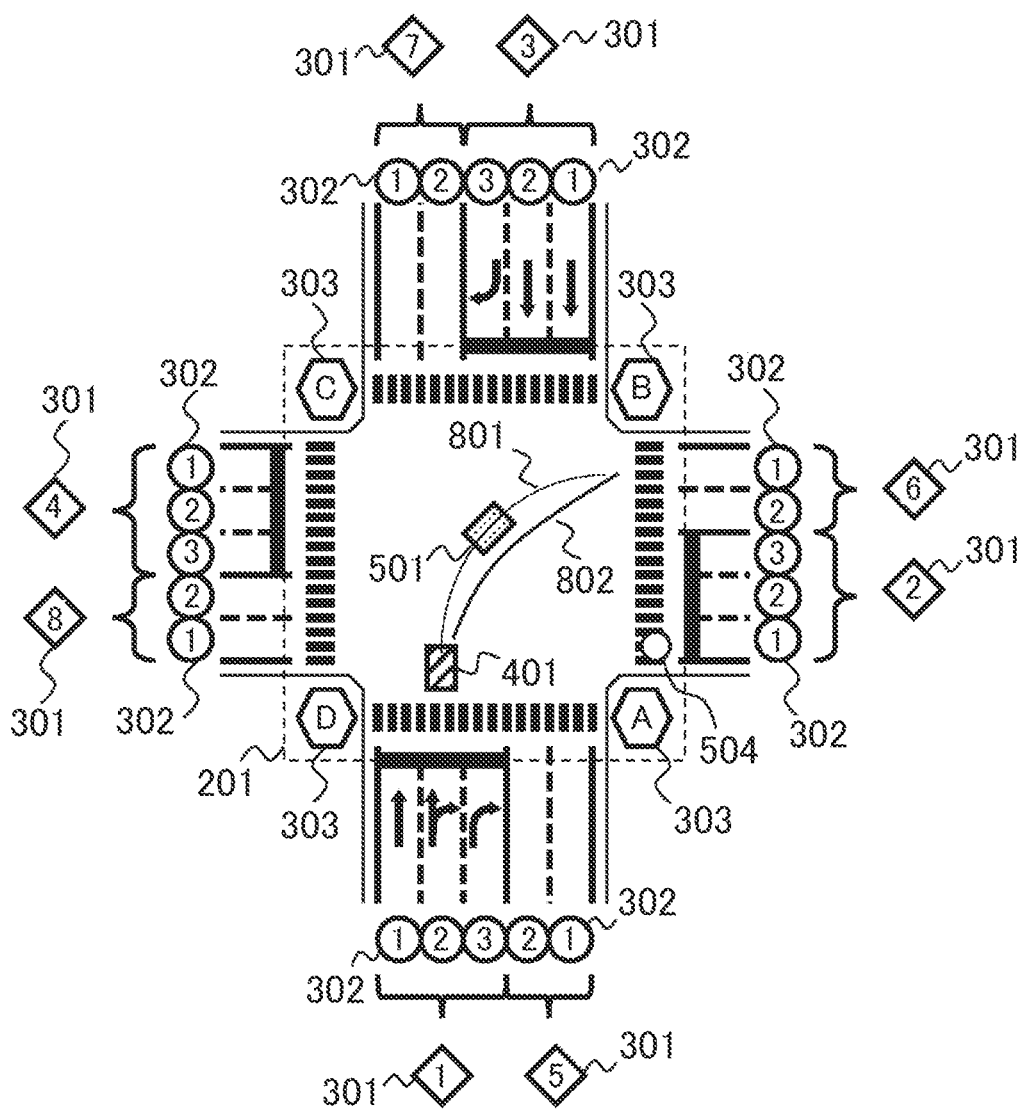
FIG. 8 is a figure depicting an example of a situation of and around an intersection according to a third embodiment of the present invention.

FIG. 8 is a figure depicting an example of a situation of and around the intersection according to the third embodiment of the present invention. The intersection area 201 depicted in FIG. 8 is an example of a subject area of processes implemented by the electronic control unit 1 according to the present embodiment, and is similar to the example explained about the first embodiment. That is, each road connected to the intersection area 201 is given a road number, and a lane number as represented by reference characters 301, and 302, and a crosswalk marked in each road is given a crosswalk number as represented by reference character 303.

It is supposed in FIG. 8 that the user's vehicle 401 has entered the intersection area 201 from a road with road number 1, and lane number 2, and is driving toward a road with road number 6, and lane number 1. An entrance position ID, and exit position ID of the user's vehicle 401 at this time are represented as "1-2," and "6-1," respectively. At this time, before the user's vehicle 401 reaches its position in FIG. 8, the target information acquiring section 102 acquires target information about the non-user's vehicle 501 having entered the intersection area 201.

The target position area deciding section 106 receives, as input, the target information (e.g. positional information) about the non-user's vehicle 501 acquired by the target information acquiring section 102, and the map information about the intersection area 201 acquired by the map information acquiring section 101. On the basis of these types of information, the target position area deciding section 106 decides that there is the non-user's vehicle 501 in the intersection area 201, and notifies the intra-area target searching section 107 of results of the decision.

Upon being notified from the target position area deciding section 106 that there is the non-user's vehicle 501 in the intersection area 201, the intra-area target searching section 107 searches the intra-area target management table 110 for information about the non-user's vehicle 501 in accordance with the notification. Thereby, as information about a target that should be taken into consideration when a driving trajectory of the user's vehicle 401 is planned, the entrance position ID, exit position ID, and end-of-line flag of the non-user's vehicle 501 are obtained. These types of information found through the search in the intra-area target management table 110 are notified from the intra-area target searching section 107 to the driving trajectory planning section 108.

On the basis of the information about the non-user's vehicle 501 notified from the intra-area target searching section 107, the driving trajectory planning section 108 plans a driving trajectory of the user's vehicle 401 as explained below.

In the cases considered in the present embodiment, in the situation depicted in FIG. 8, for example, the intra-area target management table 110 with contents that are depicted in FIG. 9 and FIG. 10 are stored in the storage section 105. Similarly to the intra-area target management table 110 in FIG. 3 and FIG. 4 explained in the first embodiment, in the intra-area target management table 110 in FIG. 9 and FIG. 10, the columns 111, 112, 113, and 114 include a target ID, an entrance position ID, an exit position ID and an end-of-line flag that are set for the non-user's vehicle 501. The expression format of each of these set values is similar to the expression format explained in the first embodiment.

First, the driving trajectory planning section 108 compares entrance position ID "1-2," and exit position ID "6-1" of the user's vehicle 401 mentioned before, and the entrance position ID, and exit position ID of the non-user's vehicle 501 notified from the intra-area target searching section 107, respectively. Here, in a case that the intra-area target management table 110 has contents depicted in FIG. 9, the values of the entrance position ID, and exit position ID of the non-user's vehicle 501 are "1-2," and "6-1" which are both the same as the user's vehicle 401. Accordingly, the driving trajectory planning section 108 determines that the entrance positions, and exit positions of the user's vehicle 401, and the non-user's vehicle 501 match, respectively.

In a case that, as described above, it is determined that the entrance positions, and exit positions of the user's vehicle 401, and the non-user's vehicle 501 match, respectively, the driving trajectory planning section 108 checks the end-of-line flag of the non-user's vehicle 501 notified from the intra-area target searching section 107. Because the end-of-line flag of the non-user's vehicle 501 is "True" in the example depicted in FIG. 9, it can be determined that the non-user's vehicle 501 is positioned at the end of a line. Accordingly, the driving trajectory planning section 108 plans a driving trajectory 801 depicted in FIG. 8 such that the user's vehicle 401 follows the non-user's vehicle 501.

On the other hand, in a case that the intra-area target management table 110 has contents depicted in FIG. 10, the values of the entrance position ID, and exit position ID of the non-user's vehicle 501 are "3-3," and "8-1" which are both different from those of the user's vehicle 401. In this case, the driving trajectory planning section 108 determines the positional relationship as to how the non-user's vehicle 501 drives relative to the user's vehicle 401 from the positional relationship between road lanes represented by the entrance position ID, and exit position ID of the user's vehicle 401, road lanes represented by the entrance position ID, and exit position ID of the non-user's vehicle 501.

It can be determined about the positional relationship of road lanes depicted in FIG. 8 that the non-user's vehicle 501 is an oncoming car of the user's vehicle 401, and is to make a right turn toward a left road as seen from the user's vehicle 401. Accordingly, the driving trajectory planning section 108 plans a driving trajectory 802 such that the user's vehicle 401 passes by the non-user's vehicle 501 on the right side of the non-user's vehicle 501.

Figure 11:
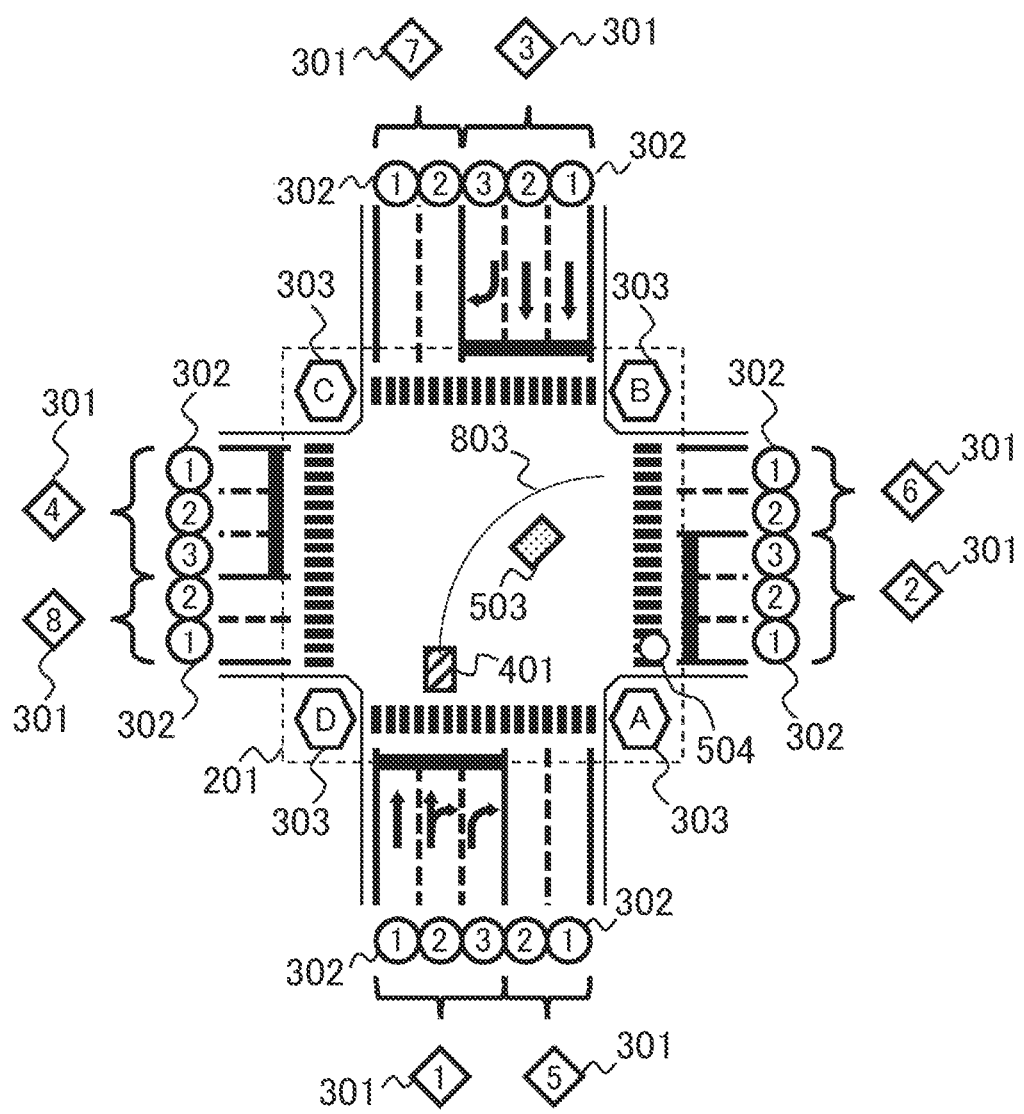
FIG. 11 is a figure depicting another example of a situation of and around an intersection according to the third embodiment of the present invention.

FIG. 11 is a figure depicting another example of a situation of and around the intersection according to the third embodiment of the present invention. Similarly to FIG. 8, the intersection area 201 depicted in FIG. 11 also is an example of a subject area of processes implemented by the electronic control unit 1 according to the present embodiment. That is, each road connected to the intersection area 201 is given a road number, and a lane number as represented by reference characters 301, and 302, and a crosswalk marked in each road is given a crosswalk number as represented by reference character 303.

Similarly to FIG. 8, it is supposed in FIG. 11 also that the user's vehicle 401 has entered the intersection area 201 from a road with road number 1, and lane number 2, and is driving toward a road with road number 6, and lane number 1. That is, an entrance position ID, and exit position ID of the user's vehicle 401 at this time are represented as "1-2," and "6-1," respectively. At this time, before the user's vehicle 401 reaches its position in FIG. 11, the target information acquiring section 102 acquires target information about the non-user's vehicle 503 having entered the intersection area 201.

The target position area deciding section 106 receives, as input, the target information (e.g. positional information) about the non-user's vehicle 503 acquired by the target information acquiring section 102, and the map information about the intersection area 201 acquired by the map information acquiring section 101. On the basis of these types of information, the target position area deciding section 106 decides that there is the non-user's vehicle 503 in the intersection area 201, and notifies the intra-area target searching section 107 of results of the decision.

Upon being notified from the target position area deciding section 106 that there is the non-user's vehicle 503 in the intersection area 201, the intra-area target searching section 107 searches the intra-area target management table 110 for information about the non-user's vehicle 503 in accordance with the notification. Thereby, as information about a target that should be taken into consideration when a driving trajectory of the user's vehicle 401 is planned, the entrance position ID, exit position ID, and end-of-line flag of the non-user's vehicle 503 are obtained. These types of information found through the search in the intra-area target management table 110 are notified from the intra-area target searching section 107 to the driving trajectory planning section 108.

On the basis of the information about the non-user's vehicle 503 notified from the intra-area target searching section 107, the driving trajectory planning section 108 plans a driving trajectory of the user's vehicle 401 as explained below.

In the cases considered in the present embodiment, in the situation depicted in FIG. 11, for example, the intra-area target management table 110 with contents that are depicted in FIG. 12 are stored in the storage section 105. In the intra-area target management table 110 in FIG. 12 also, the columns 111, 112, 113, and 114 include a target ID, an entrance position ID, an exit position ID, and an end-of-line flag that are set for the non-user's vehicle 503 in an expression format similar to that in FIG. 9, and FIG. 10 mentioned before.

First, the driving trajectory planning section 108 compares entrance position ID "1-2," and exit position ID "6-1" of the user's vehicle 401 mentioned before, and the entrance position ID, and exit position ID of the non-user's vehicle 503 notified from the intra-area target searching section 107, respectively. In FIG. 12, the values of the entrance position ID, and exit position ID of the non-user's vehicle 503 are "1-3," and "6-2" which are both different from those of the user's vehicle 401. In this case, similarly to the case depicted in FIG. 10 mentioned before, the driving trajectory planning section 108 determines the positional relationship as to how the non-user's vehicle 503 drives relative to the user's vehicle 401 from the positional relationship between road lanes represented by the entrance position ID, and exit position ID of the user's vehicle 401, road lanes represented by the entrance position ID, and exit position ID of the non-user's vehicle 503.

It can be determined about the positional relationship of road lanes depicted in FIG. 11 that the non-user's vehicle 503 is driving on a right lane relative to the user's vehicle 401, and is to make a right turn toward a lane which is on the same road as the destination of a right turn of the user's vehicle 401, and is on the right side of a lane to which the user's vehicle 401 is heading. That is, it can be determined that the non-user's vehicle 503 is to drive to make a right turn on the right side of the user's vehicle 401. Accordingly, the driving trajectory planning section 108 plans a driving trajectory 803 such that the user's vehicle 401 passes by the non-user's vehicle 503 on the left side of the non-user's vehicle 503.

Note that whereas in the example described above, there is the non-user's vehicle 503 that is to drive to make a right turn on the right side of the user's vehicle 401, and a driving trajectory is planned such that the user's vehicle 401 passes by the non-user's vehicle 503 on the left side of the non-user's vehicle 503, in a case that there is a non-user's vehicle that is to drive to make a right turn on the left side of the user's vehicle 401, it is similarly possible to plan a driving trajectory such that the user's vehicle 401 passes by the non-user's vehicle on the right side of the non-user's vehicle. In addition, situations are not limited to those at the time of making right turns, and at the time of making left turns or driving straight in a case that there is a non-user's vehicle that is driving on the right side or the left side, it is similarly possible to plan a driving trajectory such that the user's vehicle 401 passes by the non-user's vehicle on the left side or the right side of the non-user's vehicle.

According to the third embodiment of the present invention explained above, effects and advantages that are similar to those explained in the first embodiment are attained.

Note that whereas the intersection area 201 including an intersection, and the tollgate exit area 203 including a tollgate exit are explained as examples of subject areas of processes implemented by the electronic control unit 1 in the first to third embodiments explained above, subject areas of the processes are not limited to them. That is, subject areas to which the present invention is applied are not specially restricted. In particular, it is useful to apply the present invention for safe driving at locations where map information does not retain information about roads and lanes. In the embodiments, the intersection area 201, and the tollgate exit area 203 are depicted, and explained as examples of such locations. Other than them, for example, the present invention can also be applied to roundabouts and parking lots. In a case that the present invention is applied to a roundabout, similarly to the cases depicted about the intersection, roads, and lanes connected to the roundabout can be set as entrance positions, and exit positions. In addition, in a case that the present invention is applied to a parking lot, exits/entrances, and parking frames of the parking lot can be set as entrance positions, and exit positions. Other than this, the present invention can be applied to various locations.

Embodiments, and various change examples explained above are merely examples, and the present invention is not limited to those contents as long as features of the invention are not impaired. The present invention is not limited to embodiments, and modification examples mentioned above, and can be changed in various manners within the scope not deviating from the aim of the present invention. The configuration, and specifics of the present invention can be changed in various manners that can be understood by parties concerned, within the scope of the present invention.

The contents disclosed by the following priority application are incorporated herein as a reference.

Japanese Patent Application No. 2019-128408 (filed on Jul. 10, 2019)

LIST OF REFERENCE SIGNS

1: Electronic control unit
101: Map information acquiring section
102: Target information acquiring section
103: Entrance/exit deciding section
104: Intra-area target managing section
105: Storage section
106: Target position area deciding section
107: Intra-area target searching section
108: Driving trajectory planning section
110: Intra-area target management table
201: Intersection area
202: Tollgate
203: Tollgate exit area 401: User's vehicle
501, 502, 503: Non-user's vehicle
504: Pedestrian

The invention claimed is:

1. An electronic control unit comprising:
at least one processor configured to:
acquire map information about a subject area around a user's vehicle, the subject area including an intersection;
acquire information about a non-user's vehicle around the user's vehicle;
decide (i) an entrance road lane, which is a road lane corresponding to an entrance position of the non-user's vehicle to the intersection through which the user's vehicle drives, and (ii) an exit road lane, which is a road lane corresponding to an exit position of the non-user's vehicle from the intersection, on a basis of the map information and the information acquired about the non-user's vehicle;
store management information related to the entrance road lane and the exit road lane;
predict a driving trajectory of the non-user's vehicle in the intersection on a basis of (i) the entrance road lane and the exit road lane represented by the management information and (ii) the information acquired about the non-user's vehicle; and
plan a driving trajectory of the user's vehicle on a basis of a positional relationship between the predicted driving trajectory of the non-user's vehicle and the user's vehicle,
wherein the driving trajectory of the user's vehicle is output from the electronic control unit to cause the user's vehicle to be driven in accordance with the driving trajectory of the user's vehicle,
wherein the predetermined subject area is determined on the basis of map information acquired about the user's vehicle,
wherein the information acquired about a non-user's vehicle includes (i) information of a relative position and a speed of the non-user's vehicle relative to the user's vehicle and (ii) an image of the non-user's vehicle captured by a camera mounted on the user's vehicle,
wherein the at least one processor is configured to decide (i) an advancing direction of the non-user's vehicle on a basis of the image and (ii) the entrance road lane and the exit road lane on a basis of the advancing direction, the map information, and the information of the relative position and the speed of the non-user's vehicle,
wherein the management information includes flag information representing whether or not the non-user's vehicle in a plurality of the non-user's vehicles each corresponding to a same entrance road lane is at an end of a line, and
wherein the at least one processor is configured to:
specify a non-user's vehicle positioned at the end of the line from among a plurality of the non-user's vehicles each driving in front of the user's vehicle and from among a plurality of the non-user's vehicles each driving in front of the user's vehicle and corresponding to a same combination of the entrance road lane and the exit road lane with the user's vehicle on a basis of the flag information, and
plan the driving trajectory of the user's vehicle such that it follows the specified non-user's vehicle.

2. The electronic control unit according to claim 1, wherein the non-user's vehicle is in front of the user's vehicle on the same road as the user's vehicle.

3. The electronic control unit according to claim 1, wherein the management information includes information related to an entrance position and an exit position of a pedestrian relative to a crosswalk in the intersection on which the pedestrian is walking, and
   wherein the at least one processor is configured to:
      predict deceleration of the non-user's vehicle in the driving trajectory of the non-user's vehicle before the crosswalk on a basis of the information related to the entrance position and the exit position of the pedestrian relative to the crosswalk in the management information, and
      plan the driving trajectory of the user's vehicle such that the user's vehicle decelerates according to the deceleration of the non-user's vehicle.

4. The electronic control unit according to claim 1, wherein the at least one processor acquires the information about the relative position and the speed of the non-user's vehicle from an external environment sensor mounted on the user's vehicle.

5. The electronic control unit according to claim 1, wherein the at least one processor acquires the information about the relative position and the speed of the non-user's vehicle through communication with the non-user's vehicle.

\* \* \* \* \*